(No Model.) 2 Sheets—Sheet 1.
R. T. BARTON.
NUT MACHINE.
No. 316,866. Patented Apr. 28, 1885.
Fig. 1
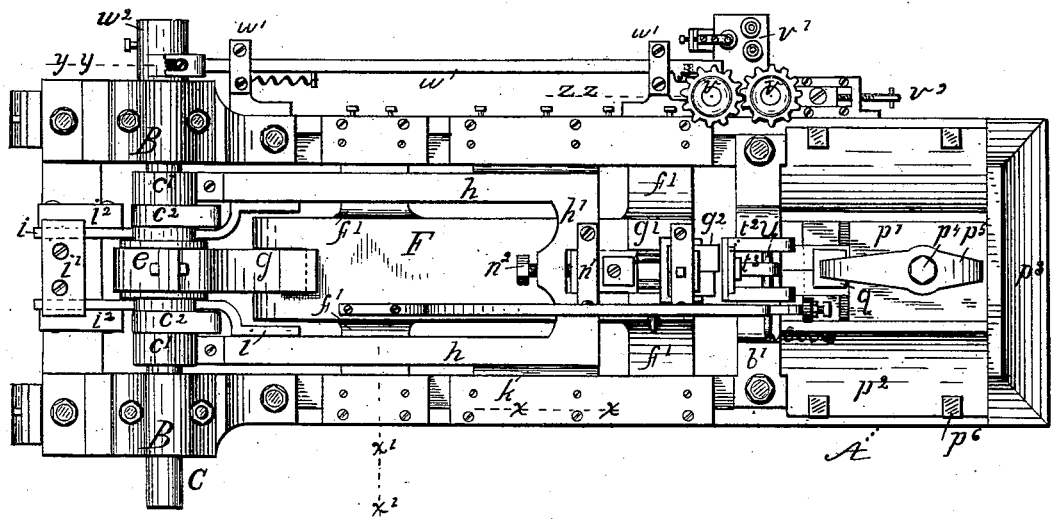
Fig. 2
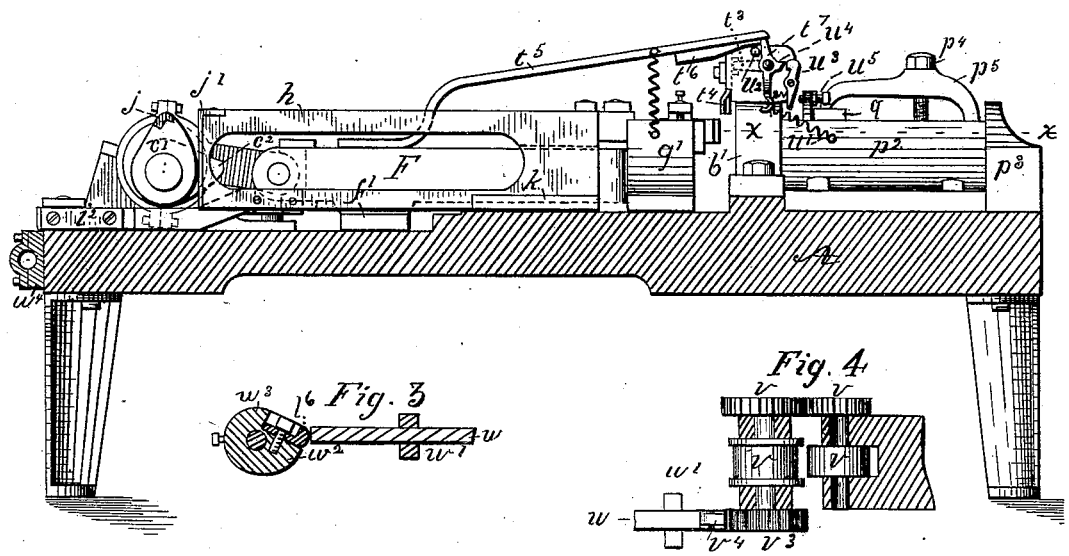
Fig. 3
Fig. 4
WITNESSES:
George L. Barnes.
Edwin C. Dow.
INVENTOR
Richard T. Barton
BY
Julius Truss
ATTORNEY (No Model.) 2 Sheets—Sheet 2.

R. T. BARTON.
NUT MACHINE.

No. 316,866. Patented Apr. 28, 1885.

WITNESSES:
George L. Barnes.
Edwin C. Dow.

INVENTOR
Richard T. Barton
BY
Julius Ivries
ATTORNEY

UNITED STATES PATENT OFFICE.

RICHARD T. BARTON, OF NEW HAVEN, CONNECTICUT, ASSIGNOR OF FIVE-SIXTHS TO ANDREW H. SMITH, OF SAME PLACE.

NUT-MACHINE.

SPECIFICATION forming part of Letters Patent No. 316,366, dated April 28, 1885.

Application filed September 5, 1884. (No model.)

*To all whom it may concern:*

Be it known that I, RICHARD T. BARTON, a citizen of the United States, residing at New Haven, in the county of New Haven and State of Connecticut, have invented new and useful Improvements in Nut-Machines, of which the following is a specification.

My invention relates to improvements in machines for forming nuts from cold bar-iron; and it consists in a novel die for holding the nuts while being punched, and in the construction and arrangement of the working parts of the machine, as hereinafter more fully specified, and particularly pointed out in the claims.

Figure 5:
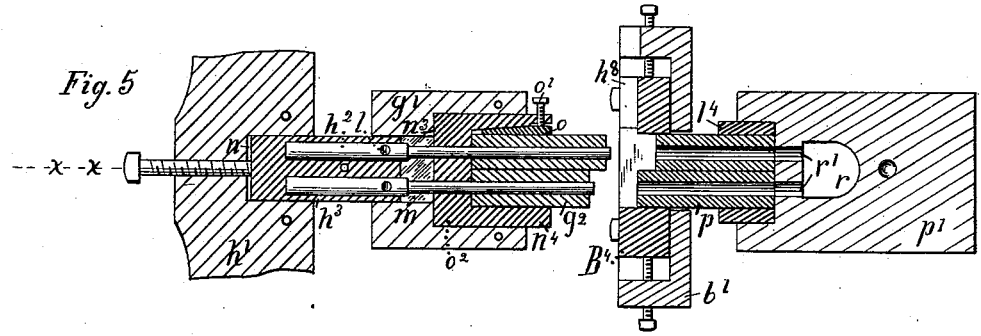
Figure 6:
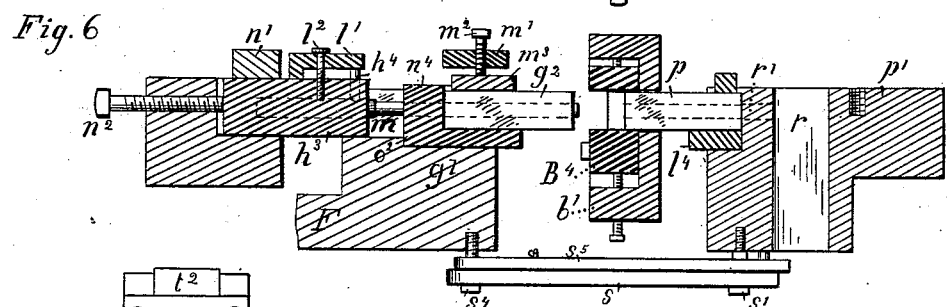
Figure 8:
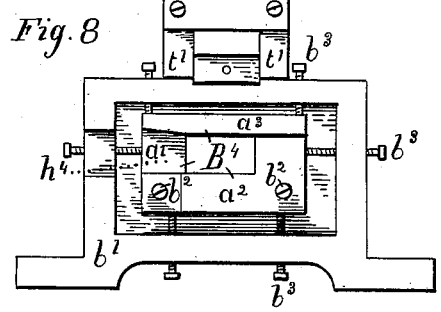
Figure 7:
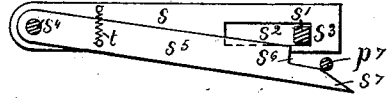
Figure 9:
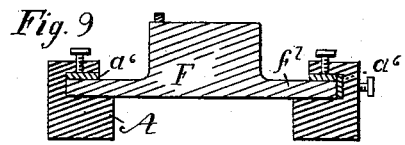
Figure 10:
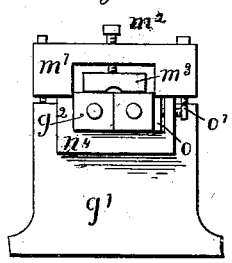
Figure 11:
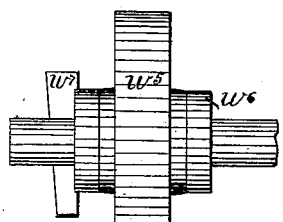
Figure 12:
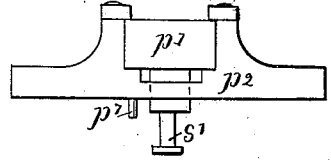

Referring to the drawings, Figure 1 is a plan view of the machine; Fig. 2, a side elevation of the working parts, with the bed in section on the line $x\ x$, Fig. 1, and one of the bearings B removed. Fig. 3 shows the feed-cam $w^2$ in vertical section on the line $y\ y$, Fig. 1. Fig. 4 is a vertical section through the feed-rolls on the line $z\ z$, Fig. 1. Fig. 5 is a horizontal section lengthwise through the punches, cutters, and dies, on the line $x\ x$, Fig. 2. Fig. 6 is a vertical section through $x\ x$, Fig. 5. Fig. 7 is a plan of the link and latch in Fig. 6. Fig. 8 is an end view of the die-holder $b'$ and adjustable die. Fig. 9 is a cross-section through $x'\ x'$, Fig. 1, showing the slide-gibs $a^6$. Fig. 10 is an end view of the head $g'$, dies $g^2$, and punches. Fig. 11 shows the method of fastening the fly-wheel on the shaft, and Fig. 12 is an end view of the guide $p^2$.

The operative parts of the machine are arranged upon a bed, A, mounted upon suitable legs. At one end of the bed are bearings B, in which a cam-shaft, C, rotates, with the double cams $c^1$ and $c^2$ and eccentric $e$ fixed thereon between the bearings. A reciprocating slide, F, with lateral gibbed guides $f'$, which traverse in guideways on the bed is connected to the eccentric by a pin and pitman, $g$, at such an angle that the pressure of the eccentric on the slide is always downward. On the end of the slide opposite the pitman is a head, $g'$, in which the dies $g^2$ are held. Another slide, $h$, composed of rectangular side pieces, arranged one upon either side of the slide F, and connected by a cross-piece, $h'$, carries the punches $h^2$. Forward motion is imparted to the slide $h$ by the cams $c'$ bearing against the steel-plated ends $j'$ of the side-pieces. Backward motion of the slide is derived from the cams $c^2$ bearing against steel blocks $i^2$ on the guide-bars $i$, which bars are attached to the side pieces, $h$, and rest on the end of the bed guided by a cap-block, $i'$. The end of the slide opposite to the shaft is supported by lateral guides $k$, traversing ways in the bed and gibbed, as shown in Fig. 9. The points of the cams $c'$ are formed of steel pieces $j$, adjustably bolted thereto, so that they may be moved outward to compensate for wear. The steel blocks $i^2$ are also adjustable on the bars $i'$, to compensate for the wear of the cams $c^2$. The shanks of the punches $h^2$ are received in a block, $h^3$, and held therein by pins $h^4$ passing down through the block and entering depressions $l$ in the punches. The pins are held down by a clamp, $l'$, pressed upon them by a screw, $l^2$. The block $h^3$ fits a recess, $n$, in the cross-piece $h'$, and is held therein by a cap, $n'$, and adjusted by a set-screw, $n^2$. The projecting end of the block $h^3$ is guided in the head $g'$, in a slot, $m$. Continuous with this slot is a recess for the reception of the case $n^4$, which abuts against the shoulder $n^3$ and is held in position by a clamping cap, $m'$, and screws. This case forms a holder for the pair of dies $g^2$, the longer of which is a cutting-die. The dies are clamped down in the case or holder by means of a set-screw, $m^2$, Fig. 10, passing through the cap $m'$ and bearing upon a shoe, $m^3$. The shoe is grooved lengthwise along the center of its under surface, thereby evenly distributing the pressure of the screw upon both dies. The dies are secured laterally by a wedge, $o$, forced in between them and the side of the holder. The wedge is prevented from backing out by a pinching-screw, $o'$.

The dies $g^2$ are perforated axially throughout their length, and corresponding holes are formed in the abutment $o^2$ of the holder $n^4$. The punches $h^2$ pass through these holes and are snugly fitted in the bores of the dies $g^2$, extending through them. In alignment with the dies $g^2$, in a holder, $l^4$, fitted in a movable head, $p'$, is a similar pair of dies, $p$, the longer of which is also a cutting-die. Both holder and dies are clamped in the head by means of a screw, $p^4$, and button-clamp $p^5$, bearing upon a shoe, $q$, similar to the shoe $m^3$.

A vertical hole, $r$, is formed through the head $p'$, and communicates by passages $r'$ with the perforations in the dies $p$ for the exit of the nut-piercings. The head abuts against a thrust-block, $p^3$, on the bed, and is moved in a guide, $p^2$, by means of a latch-and-link connection with the slide F.

The link $s$, Fig. 7, is fastened at one end by a pin, $s^4$, to the under side of the slide F, and bears at its opposite end on a T-headed square pin, $s'$, passing through a slot, $s^2$, in the link, and screwed in the head $p'$. The length and position of the slot $s^2$ are such that the pin is engaged by the bridge $s^3$ at the end of the slot just as the eccentric approaches the end of its outward throw, and moves the head $p'$.

Over the link and turning at one end on the pin $s^4$ is a latch, $s^5$, with a shoulder, $s^6$, and beveled surface, $s^7$, on its opposite end. A spring, $t$, presses the latch against a pin, $p^7$, inserted in the guide $p^2$, and as the beveled surface slides over the pin $p^7$ the latch oscillates. The position of the pin relative to the beveled surface $s^7$ is such that the shoulder $s^6$ swings in front of the pin $s'$ just as the latter is engaged by the link, and when the slide F reverses its motion the latch pushes the pin $s'$ and head $p'$ before it, disengaging from the pin just as the head abuts against the thrust-block, where it rests until the succeeding stroke of the slide.

The projecting ends of the dies $p$ are supported in an adjustable die, B$^4$, Fig. 8, which is held in a die-holder, $b'$, by means of clamping-bolts $b^2$, and set-screws $b^3$. The opening in the die is the exact size of the dies $p$, and to compensate for wear the die is made in three parts, $a'$, $a^2$, and $a^3$. As the opening wears larger it can be contracted to fit the cutting-dies by grinding the parts $a'$ and $a^2$ at the joints of the die.

Alignment of the opening with the dies $g^2$ and punches is provided for by adjusting the die B$^4$ in the die-holder by means of set-screws $b^3$, and the holes for the bolts $p^6$ are elongated so that the way $p^2$ and head $p'$ may be adjusted to align with the die B$^4$. These advantages of adjustment are indispensable to the production of perfect nuts.

The die-holder $b'$ is bolted to the bed, abutting against the way $p^2$, and on its upper side are two uprights, $t'$, Fig. 8, forming guideways in which a vertical slide, $t^2$, travels, operated by a rock-arm, $t^3$, on a shaft, $u$, Fig. 1, arranged in bearings in the uprights. The lower end of the slide carries a sheet-metal strip, $t^4$, Fig. 2, for removing the nuts from the dies when they may adhere thereto. The slide $t^2$ is lifted by the action of a spring bar, $t^5$, fastened on the slide F and carrying a block, $t^6$, the end of which engages the upper end of a lever, $t^7$, on the end of the rock-shaft. To the opposite end of the lever is attached a spring, $u'$. An inclined surface on the block $t^6$ travels over a pin, $u^2$, fixed in one of the uprights $t'$, and lifts the block from engagement with the lever $t^7$, when the slide $t^2$ has been raised to its proper height. As the lever becomes disengaged a hook, $u^3$, pivoted on one of the uprights and operated by a spring, engages a projection, $u^4$, on the lever $t^7$, and holds the lever stationary until the head $p'$ and dies $p$ push the nuts out of the die B$^4$, when an adjustable screw, $u^5$, in a projection on the head comes in contact with and disengages the hook $u^3$ from the lever, and the remover descends with a sharp blow, knocking the nuts off the dies. The bar-iron for the blanks is automatically fed between the dies by geared feed-rolls $v$ and guide-rolls $v'$. One of the feed-rolls is adjustable by means of a screw, $v^2$, and movable bearings. The other feed-roll revolves in fixed bearings and has on its shaft a ratchet, $v^3$, engaged by a pawl, $v^4$, pivoted on a rod, $w$, which is reciprocated in supports $w'$ by means of a cam, $w^2$, fixed on the cam-shaft.

In order to adjust the movement of the feed-rolls, the point of the cam $l^6$ is made movable and bolted to the cam on a surface diagonal to its radius, so that it can be set out from the center, the bolt-hole in the part $l^6$ being elongated accordingly. The part $l^6$ abuts against a projection, $w^3$, on the fixed part of the cam, and shims are placed between the projection and part $l^6$ as the latter is moved out to lengthen the cam.

A fly-wheel, $w^5$, Fig. 11, is arranged upon either the pulley or pinion shaft and fixed thereon by means of a friction-disk, $w^6$, and key $w^7$, passing through the shaft. The key forces the hub of the wheel against the disk $w^6$, producing sufficient friction to hold the wheel firmly on the shaft in the ordinary operation of the machine, but allowing it to slip if any part of the machine becomes blocked.

Constructed as above described and shown, the operation of my improved nut-machine is as follows: The bar-iron is fed by the rolls $v$ into the adjustable die B$^4$ through a depression, $h^3$, in the face of the part $a'$, and stops against the part $b^2$, resting against the longer of the dies $p$ and the side of the part $a'$. In the revolution of the cam-shaft the dies $g^2$, which are arranged to match the dies $p$, advance, and the longer die shears a nut out of the bar of iron, leaving a similar nut on the end of the longer of the opposite dies $p$. After being cut the two nuts remain clamped between the ends of the dies while the eccentric is passing its dead-center, and while so compressed the punches $h^2$ advance and pierce the nuts. The punches and dies then retreat, and as the eccentric approaches the opposite end of its throw the dies $p$ advance, operated by the latch and link $s$ and $s'$, and eject the nuts from the die B$^4$. At this point the set-screw $u^5$ trips the hook $u^3$, and the remover, having been previously raised with the advance of the eccentric, descends with a sharp blow, operated by the spring $u'$ and removes the nuts.

What I claim as new, and desire to secure by Letters Patent, is—

1. In a nut-machine a die, B$^4$, composed of the three mutually-adjustable parts, $a'$, $a^2$, and $a^3$, as and for the purpose specified.

2. The combination, with the die-holder $b'$, of the adjustable die $B^4$, fastened and adjusted therein, substantially in the manner and for the purpose specified.

3. In a nut-machine, the method of securing the dies $g^2$ in their holder by means of a grooved shoe and wedge, which are held in place by clamping cap and screws, substantially as described.

4. The combination of the holder $n^4$, dies $g^2$, and wedge $o$, secured by pinching-screw, with the head $g'$, shoe $m^3$, and clamping-cap $m^2$, provided with a set-screw, substantially in the manner specified.

5. A remover for a nut-machine, consisting of a vertical slide, $t^2$, operated by a rock-shaft, $u$, and arm $t^3$, and carrying metal strips for knocking off the nuts, substantially as described.

6. In the removing mechanism of a nut-machine, a lever, $t^7$, operating the rock-shaft and remover, and oscillated in one direction by a spring and in the opposite direction by a reciprocating and disengaging spring-latch, $t^5$, in the manner substantially as described.

7. In a nut-removing mechanism, the combination, with the lever $t^7$, for operating the rock-shaft and remover, of a hook, $u^3$, adapted to engage and hold the lever while disengaged from the latch, and to be released by an adjustable trip fixed on the head $p'$, as and for the purpose specified.

8. The combination of the reciprocating spring-bar $t^5$, the lever $t^7$, operating the rock-shaft and remover, the spring-actuated hook $u^3$, adapted to engage and hold the lever while disengaged from the bar, and the adjustable trip $u^5$, fixed on the head $p'$, all arranged in the manner and for the purpose specified.

9. In a nut-machine, the combination, with the slide F, of a link, $s$, adapted to impart forward motion to the head $p'$ and dies $p$, and a latch, $s^5$, adapted to impart backward motion to the same by engagement with the stud $s'$, fixed on the head, all arranged in the manner substantially as described.

RICHARD T. BARTON.

Witnesses:
  JULIUS TWISS,
  DAVID K. ANDREWS.